United States Patent [19]

Thijssen

[11] Patent Number: 6,154,763
[45] Date of Patent: Nov. 28, 2000

[54] METHOD FOR SPECIFYING A SYSTEM HAVING A PLURALITY OF INTERCONNECTED FUNCTIONAL MODULES, EACH REPRESENTING A RESPECTIVE ABSTRACT-STATE BASED MACHINE, AND A SYSTEM SO SPECIFIED

[75] Inventor: Paulus T. A. Thijssen, Eindhoven, Netherlands

[73] Assignee: U.S. Philips Corporation, New York, N.Y.

[21] Appl. No.: 08/721,161

[22] Filed: Sep. 26, 1996

[30] Foreign Application Priority Data

Sep. 28, 1995 [EP] European Pat. Off. ............. 95 202615

[51] Int. Cl.[7] ........................................................ G06F 9/00
[52] U.S. Cl. ............................ 709/102; 326/46; 710/100; 709/102; 712/32
[58] Field of Search .................................... 364/200, 468; 371/62, 16; 370/364; 326/46; 395/650; 712/1, 32, 245, 246; 700/7, 8, 10, 11; 709/102; 710/100

[56] References Cited

U.S. PATENT DOCUMENTS

| | | | |
|---|---|---|---|
| 4,455,652 | 6/1984 | Van Der Meulen ...................... 371/16 |
| 4,727,549 | 2/1988 | Tulpule et al. ............................ 371/62 |
| 4,796,178 | 1/1989 | Jennings et al. ........................ 364/200 |
| 4,799,141 | 1/1989 | Drusinsky et al. ..................... 364/141 |
| 5,010,482 | 4/1991 | Keller et al. ............................. 364/200 |
| 5,056,014 | 10/1991 | Burrows ................................. 364/200 |
| 5,220,668 | 6/1993 | Bullis ...................................... 395/650 |
| 5,233,533 | 8/1993 | Edstrom et al. ......................... 364/468 |
| 5,477,168 | 12/1995 | Thijssen et al. ........................... 326/46 |
| 5,504,896 | 4/1996 | Schell et al. ............................. 395/650 |
| 5,761,200 | 6/1998 | Hsieh ...................................... 370/364 |

OTHER PUBLICATIONS

H.B.M. Jonkers, Overview of the Sprint Method, Proceedings of the Formal Methods Europe Conference 1993 and published in Lecture Notes on Computer Science, No. 670, pp. 403–427, Springer 1993.

*Primary Examiner*—Dung C. Dinh
*Attorney, Agent, or Firm*—Anne E. Barschall

[57] ABSTRACT

A method for specifying a system comprising a plurality of interconnected functional modules each representing a respective abstract-state based machine, and a system so specified. A system is specified to include various interconnected functional modules at respective hierarchical levels. Each module represents an abstract state-based-machine. Each non-top level first module connects to a single second module at a next higher level by a transformer link from the second module for enabling a relevant change-of-state of the first module, by an observer link for a state enquiry signal from the second module, and by an event link for a solicited event signal to the second module. The first module retrosignals an internal autonomously executed step. Each non-bottom module enables one or more lower level modules to function as such first module. A top module can exchange signals with an environment. A single step scheduler for the system renders autonomously executable each step in the first module that has been entered under control of a preconditioning transformer signal received from the second module.

23 Claims, 4 Drawing Sheets

```
110  extern Stack step_stack;
112  void scheduler()
114  {
116  StepResult result
118  do
120  {
122  if(is_empty(&step_stack))
124  {
126  return;
128  }
130  result=(*top(&step_stack))();
132  if(result==Failed)
134  {
136  pop(&step-_stack);
138  }
140  }
142  while(result!=Blocked);
144  return;
146  }
```

FIG. 5

METHOD FOR SPECIFYING A SYSTEM HAVING A PLURALITY OF INTERCONNECTED FUNCTIONAL MODULES, EACH REPRESENTING A RESPECTIVE ABSTRACT-STATE BASED MACHINE, AND A SYSTEM SO SPECIFIED

BACKGROUND TO THE INVENTION

The invention relates to a method for specifying a system to include a plurality of interconnected functional modules at respective hierarchical levels, each module representing a respective abstract state-based-machine. The modules may be hardware, and in particular, electronic modules, although this is not an absolute restriction. Alternatively, a module may be realized as a software module, or a composite of both hardware and software. In this same respect, the modules as a group may be realized in a uniform manner, or in a non-uniform manner. Each module behaves as an abstract state-based-machine, that has a plurality of states, but whereof the realization is still open to many options, and which therefore is called an abstract machine. By itself, an exemplary realization of such a state machine has been disclosed in U.S. Pat. No. 5,477,168 to the present assignee and herein incorporated by reference. Present-day computer-oriented hardware is rendered functional for a particular purpose only through specifying the workings thereof by an ever-increasing amount of appropriate software, that fits both to the hardware and to the intended application functionality. Generally, such software is of the multiprocessing type, inasmuch as this allows reusability of the various software modules, mutual interfacing between the modules on a manageable level of complexity, sharing of programming effort over multiple persons, and easier checking for errors. It has been found necessary to specify the various modules according to a straightforward methodology, in order to guarantee reliability, consistency, and maintainability. Relevant art has been presented by H. B. M. Jonkers, Overview of the SPRINT Method, Proceedings of the Formal Methods Europe Conference 1993 and published in Lecture Notes on Computer Science, No. 670, pp 403–427, Springer 1993. A basic language COLD is used therein for describing systems in an abstract manner without necessitating the specifying of an implementation. The SPRINT methodology allows for an easy way to subsequently implement such systems. However, for many environments the above methodology requires further optimization.

SUMMARY OF THE INVENTION

In consequence, amongst other things, it is an object of the present invention to provide a framework for allowing the above specifying according to a straightforward strategy that is little subject to errors, and in particular, to allow the controlling of the stepping between the various states in a simple and straightforward manner. Now, according to one of its aspects the invention provides a system, wherein each non-top level first module is connected to a single second module at a next higher level, by a transformer link from the second module for enabling a relevant change-of-state of the first module, by an observer link for receiving a state enquiry signal from the second module, and by an event link for outputting a solicited event signal to the second module, said first module having means for retrosignalling to the second module an internal autonomously executed step and each non-bottom module is, as such second module, arranged for connecting to one or more lower level modules, each of which then functions as such first module, and wherein a top module is arranged for signal exchanging with an environment, and by means of in said first module entering each said step into a single step scheduler for the system to render such step autonomously executable, said entering being subject to a preconditioning transformer signal received from said second module.

The uniform interfacing between the various modules allows to design their internal operativity in a straightforward and simple manner, the simple external interface of the system is easy to standardize, and the provision of a single step scheduler for the whole system implements a simple strategy for executing the steps without mutual contradiction therebetween. In particular, the present invention relates to a specific implementation of SPRINT.

Advantageously, the step scheduler is a stack scheduler and said entering is a push operation. It has been found in practice that a stack scheduler provides the most straightforward control mechanism, although in principle others, such as FIFO would be feasible as well.

Advantageously, such step is furthermore secondarily conditioned for executability by one or more of a transformer signal, or an underlying event, or an observer signal, any of these occurring unto said first module. Thus, the transformer signal puts the step on the scheduler, but the executability or otherwise of the step in question may undergo further changes even when on the scheduler. This provides an advantageous two-tier enabling mechanism.

Advantageously, the method restrictively defines a step upon its execution to return one of the following three alternative values: succeeded, failed, or blocked. It has been found that these three collectively constitute a set that provides a wide applicability of the method, whilst still keeping implementation simple.

The invention also relates to a system comprising a system comprising a plurality of hierarchically arranged and interconnected functional modules each representing a respective abstract state-based-machine, each non-top first module connecting to a single second module at a next higher level by means of a transformer link from the second module for enabling a relevant change-of-state of the first module, by means of an observer link from the second module for receiving a state enquiry signal, and by means of an event link to the second module for outputting a solicited event signal, said first module having means for retrosignalling an internal autonomous step and wherein each non-bottom module is, as such second module, interconnected to one or more lower level modules, each of which then functions as such first module, and wherein a top module is arranged for signal interchanging with an environment, and said system having a single step scheduler for autonomously rendering each said step executable in said first module and entering means for under control of a preconditioning transformer signal received from said second module entering said step into said scheduler.

The straightforward manner of specifying a wide gamut of such systems allows these systems to be fruitfully applied in very diverse environments. Further advantageous aspects of the invention are recited in dependent Claims.

BRIEF DESCRIPTION OF THE DRAWINGS

These and other aspects and advantages will be discussed more in detail hereinafter with reference to the disclosure of preferred embodiments, and more particularly with reference to the appended Figures that show:

FIG. 5, a scheduler source code.

DISCLOSURE OF PREFERRED EMBODIMENTS

Figure 1:
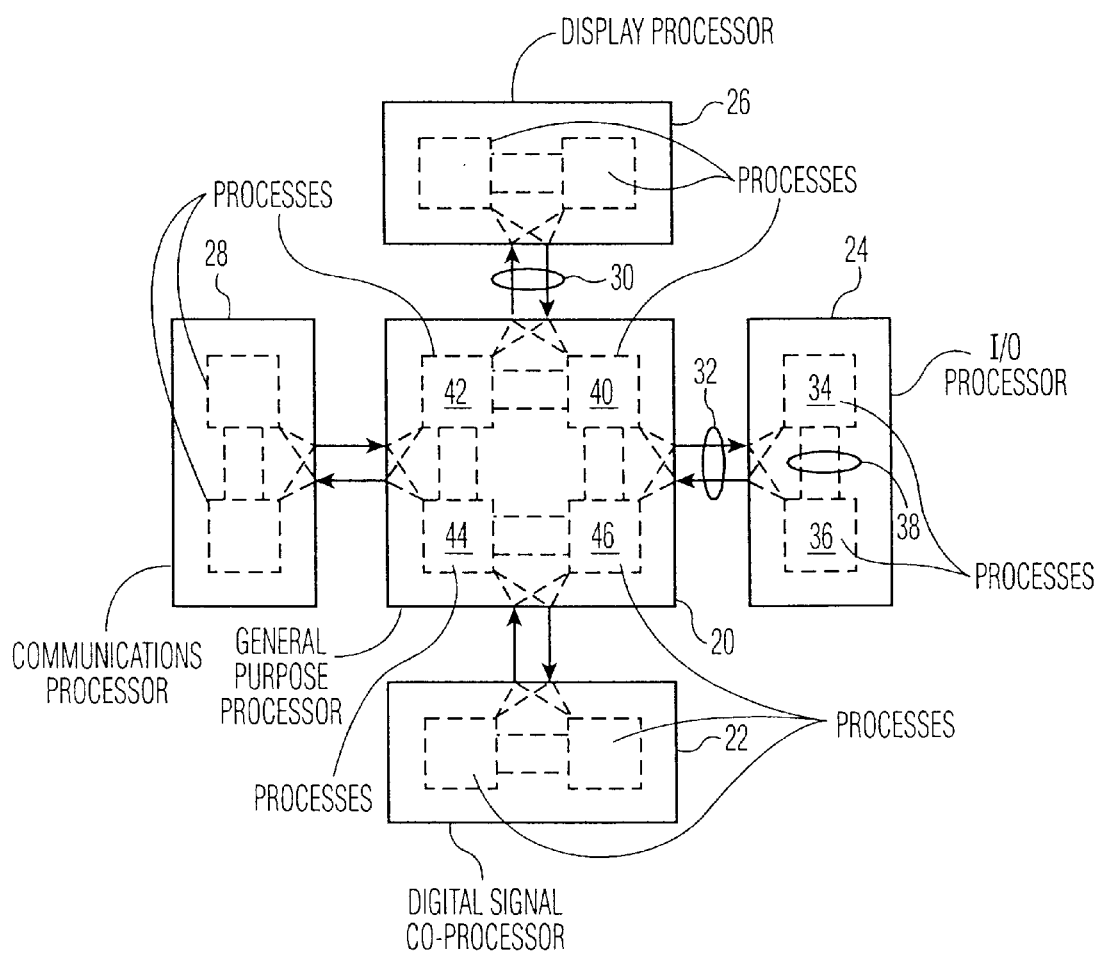
FIG. 1, a schematic processor configuration.

FIG. 1 by way of example, schematically shows a processor configuration. The interconnected functional modules thereof, either on a hardware level or on a software level, represent a system specified according to method of the invention. Central general purpose processor 20 is connected to four pieces of peripheral hardware 22–28, that may be processors as well. For example, block 22 is a digital signal coprocessor, block 24 is a user I/O processor, block 26 is a display processor, and block 28 is a communications processor. All processors exchange signals as indicated by respective solid lines such as 30, 32. Moreover, all processors contain operating processes indicated by dashed lines, such as processes 40–46 in central processor 20 and processes 34, 36 in peripheral processor 24. The various processes may communicate with other processes in the same processor over further connections such as connections 38. The various processes may also communicate via the hardware interconnections between the various processors such as 30, 32.

For the moment, the specific user functionality of the various processors and processes is irrelevant. Their numbers, complexity, and interoperativity are not specified further. The system may be single processor, multiprocessing. Also, the present description abstracts from the realization of various electronic, electro-mechanical, display, and other conversion devices. However, correct synchronization between the various processes must adhere to strict requirements, so that mutual deadlocking and various other types of malfunction would be inherently impossible. According to the present invention, each of the processes is an abstract state-based-machine. A stack scheduler is provided for all processes together, or a respective stack scheduler is provided for all processes of a particular subset of the abstract state-based-machines that form a subsystem. In the latter case the various stack schedulers may synchronize with each other through a handshake organization, or themselves be organized in their turn by a higher level overall scheduler. By itself, other schedulers than stack schedulers may in principle also solve the problem. For simplicity, no stack scheduler has been shown in the Figure, inasmuch as by itself, a stack scheduler is straightforward to implement.

If the system to be described hereinafter contains only a single stack, it is easy to check which step has to be executed next, inasmuch only the stack needs to be interrogated. Also when the top step of the stack cannot be executed, the mechanism for selecting the next step from the stack is simple. Given this facility, the system hierarchy can be fully optimized without further considering the interrogating. This allows to specify much bigger systems without errors occurring in the specifying. Particular external influences such as hardware interrupts or influences from external schedulers can easily be coped with. The scheduler needs only to control the execution of the steps.

Figure 2:
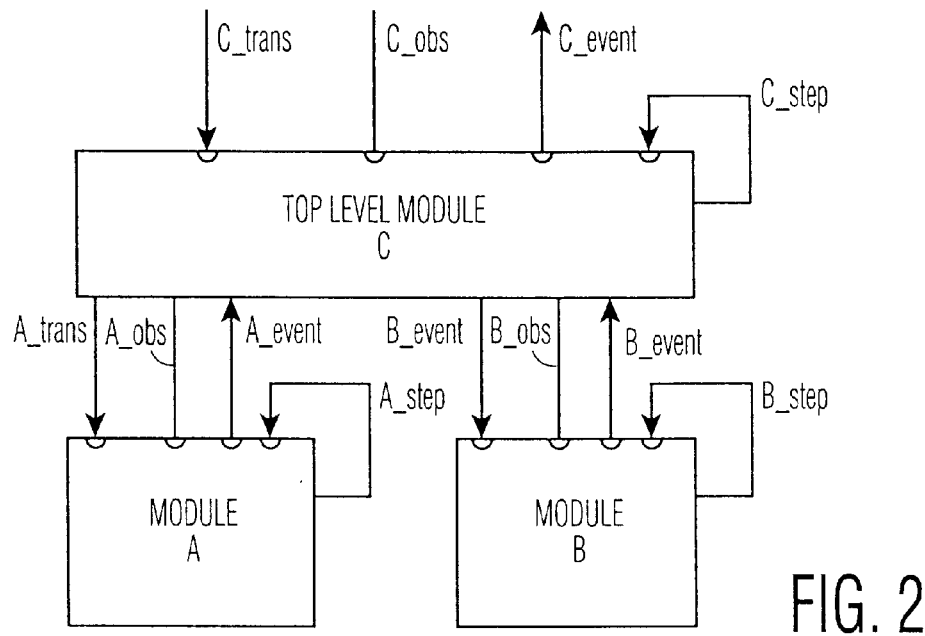
FIG. 2, an exemplary model according to the invention.

To provide a correct solution for specifying such system, FIG. 2 shows an exemplary model according to the invention for describing cooperation between process modules. The level of communication primitives between the processes is outside the scope of the invention proper. The manner of mapping of the various functional modules on respective hardware blocks is irrelevant as well. The solution of the invention is the hierarchical setup of FIG. 2.

Therein, two modules A, B are each controlled by a single higher level module C. Module C in this example is the top-level module, because there is no higher level module. Modules A, B in this example are bottom-level modules, because there is no lower level module. Therefore, module C is a non-bottom module, whereas modules A, B are non-top modules. Not all branches of the tree need to have an identical number of levels. The number of lower level modules that are controlled by a particular single higher level module is in principle arbitrary.

As shown in the Figure, for all models of the various modules, four elementary communication entities or links have been defined, that are called transformers, observers, events and steps, respectively. Generally, the half-circles indicate the passive side of a communication process where the communication signal is awaited, and more in particular, the side where the communication operation in question is defined. In certain cases, not all four of the entities shown need to be defined for each module to module interface. Of the above four entities, the first three, transformers, observers, and events, can only be called by a controlling module:

A transformer input link such as A_trans signals from module C to module A an actual change-of-state in module C that can enable a relevant subsequent change-of-state of module A, although the execution proper may be kept pending. An additional feature of a transformer link can be the signalling back of a result. For example, when receiving a 'write' command, the signalling back may specify the amount of data to be written. The execution of the step then controls the actual writing, the termination of the writing provides an event.

An observer link such as A_obs signals a request from module C to module A indicating that module C wants to receive a state signalization from module A, in combination with the actually associated state signalization from module A back to module C. An event output link such as A_event from module A to module C is used for upon its interrogation by module C outputting an event signal. At the instant of such outputting, the signal in question that caused such outputting is reset, so that interrogating is a one-time feature: if nothing happens, a subsequent interrogation produces a negative result. A typical but non-limiting example of an event is the completion of an operation. The difference between A_event and A_obs is that the latter provides in principle a steady signalization. In combination with the event signalling, the state of module A will have changed in that the signalled event has then passed. From the above it follows that an observer link may also be used for signalling a change-of-state to a higher level module. The difference with an event signalization is that the latter is more instantaneous than the observer.

On the other hand, a retrosignalling such as A_step is used for modelling the autonomous actions of a module. In particular, a step is assumed to be executed as soon as its precondition has become true. In a particular implementation, each step must be called explicitly by an appropriate scheduler. Now, the interface as described gives the complete set of interactions between pairs of modules. If appropriate, the interface can be degraded, in that one or more of the signalizations are absent.

Figure 3:
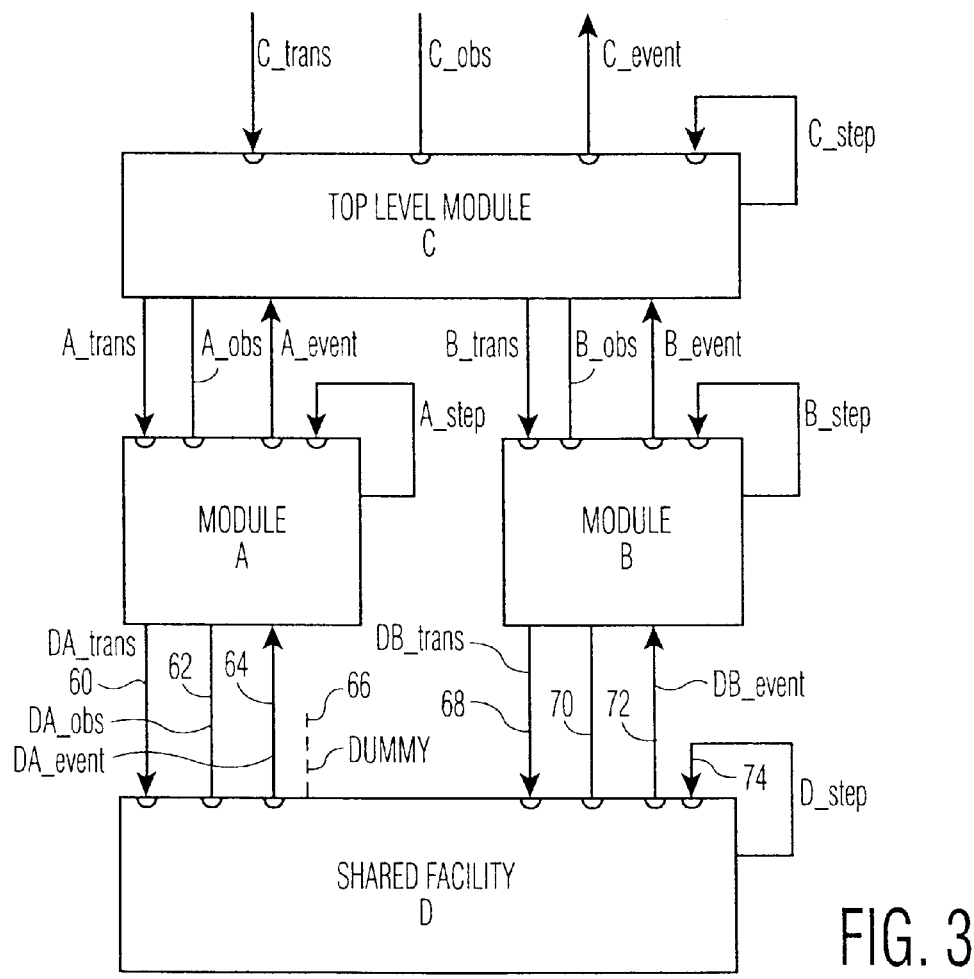
FIG. 3, an extension of the model of FIG. 2.

FIG. 3 gives an extension of the model, that has been built starting from the model of FIG. 2. In addition to the latter's three modules A, B, C, the Figure now has an additional module D. The latter module represents facilities that are shared between modules A, B, for example, an intermediate buffer facility. The model of this module to a large extent is commensurate to that of the other modules. Therefore, the various interconnections have the following functions:

60 DA_trans allowing module A to enable a change in module D;

68 DB_trans allowing module B to enable a change in module D;

62 DA_obs state request and signalization from D to A;

70 DB_obs state request and signalization from D to B;

64 DA_event signalling an event from D to A;

72 DB_event signalling an event from D to B;

74 D_step modelling an autonomous action by module D. With respect to the interface to module A, a corresponding input 66 has been shown at left. However, this represents a dummy inasmuch all aspects thereof have been mapped on item 74. Of the above links, items 64 and 72 signal events in module D and may be identical on a functional level. Even so, electrically they may be implemented doubly.

Again, additional first modules like module D may be inserted at various positions in the system, and they need not in principle be bottom modules, but could have attached further modules of still lower level thereto. However, at all times the network must remain free from loops. The top module such as C may interact with an environment. As shown, the interface in question is uniform with respect to the other interfaces, and could be to another subsystem according to the invention. However, this is not a restriction. Also, other non-top modules could have an interface to the environment, such as for receiving interrupts. Further configurational variations would be open to the skilled constructor of networks.

Figure 4:
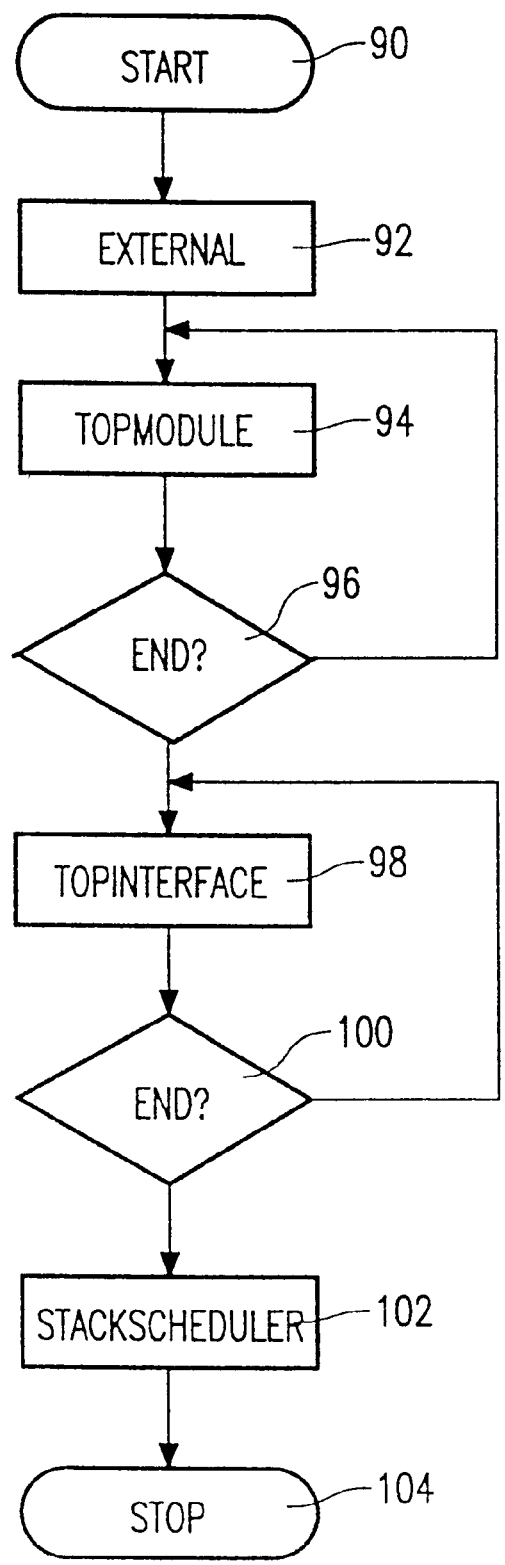
FIG. 4, a flow chart of the modelling.

FIG. 4 shows a flow chart of the modelling. Block 90 represents the start of the process, loading the internal functionalities of the modules and their intended interconnections, that have been prepared earlier, and assigning adequate processing power. In block 92, the external interface is modelled, to wit, the upper side of module C in FIG. 2. In block 94, the top module is accessed and the list of immediate child modules thereof determined. In block 96 the modelling system detects whether all modules have been treated. If no, the modelling system reverts to block 94 for accessing an appropriate module that forms the top of a partial tree. If all modules have been interlinked in this manner, the modelling system in block 98 models the interface between the top module and its immediate child modules. In block 100 the modelling system detects whether all interfaces have been modelled. If no, the modelling system reverts to block 98 for the next top module of a partial tree. If all interfaces have been treated, in block 102 the scheduler step stack is modelled, cf. infra. In block 104 the modelling system is ready, the results are outputted, and the hardware and software used for the modelling are relinquished. By itself, the top-down organization may be replaced by bottom-up or by various intermediate schemes.

Now, although in principle various different and advantageous realizations exist for the system, a particularly straightforward implementation of a step scheduler for the overall system so modelled can be realized with a step stack, that has the three standard stack operations push, top, and pop. When the precondition of a certain step becomes true, the step will be pushed on the stack. The step scheduler will always access and execute the step that is on top of the stack (top). When the precondition of the step that is on top of the stack becomes false again, the step in question is popped from the stack. If at any particular instant the stack is empty, the scheduler will do nothing.

The following scenario shows how such a scheduler can be used for the example of FIG. 2. Suppose, for example, that C_trans enables C_step, that is, C_step is pushed on the stack. Suppose now that C_step implements the following sequence: call A_trans, wait for A_event, call B_trans, wait for B_event, call A_trans again, etcetera. In consequence, A_trans enables A_step, which has to execute several steps before it disables itself again and enables A_event. Suppose that the mirrored conditions and operations hold for B_trans, B_step, and B_event, respectively.

Now, suppose that initially the stack is empty and at a certain instant C_trans is called from a higher level component or module not shown in FIG. 2. This causes C_step to be pushed on top of the stack. C_step is executed, which causes A_step to be placed on top of the stack. A_step may be executed several times but at a certain instant it may become disabled and be popped from the stack. Then C_step is again the topmost element of the stack. It then executes A_event and B_trans which causes B_step to be pushed on the stack. Subsequently, B_step is executed several times and then popped, which causes C_step to be executed again, etcetera. By itself, the realization of stacks is conventional. In this example, the control has been defined for synchronized and serialized executing of any step in the modules, according to the rules of the specifying.

The scheduler disclosed hereabove implies the following constraints on the design:

a. The precondition of a step of a certain component should be only enabled via a transformer to the same component: this puts the step in question on the scheduler. Secondary conditions for the effective execution may be fulfilled by a transformer signal, an underlying event, or an observer signal, any of these occurring onto the same module, either before, or after the occurrence of the transformer that puts the step on the scheduler.

b. Synchronous execution of steps must be possible, without violating any rule of the model, so that various systems can be implemented side by side, like in the scenario described supra.

In certain embodiment models organized according to the invention, an event, or for that matter, an observer, of a controlled (lower level) component is part of the precondition of a step of a controlling (higher level) component: a particular step can be put on the stack by a higher level transformer. In particular, more than one of these higher level transformers may be present, in which case the lower level does not know which, if any, higher level module needs the event in question. A step executable by the higher level module must have been enabled in the same higher level module by a local transformer. There is a difference between pushing on the stack (by a higher level transformer) and the becoming true of the precondition. Since the event in question and the step to be enabled by the same event are defined in different components, it is not possible for the enabler of the event to itself enable the step in question. Therefore, steps to be executed by a particular module should exclusively be enabled by a transformer signalization received in that same module, putting the step on the stack.

When at a certain instant more than one step is enabled, still only the one step that is on top of the stack will be executed. No other step can be executed until the stack is popped, or unless the other step is pushed on the stack. Therefore, the steps in the model must be defined such that synchronous execution like the one in the above scenario is possible and does not conflict with other rules.

THE STEP FEATURE WILL NOW BE DESCRIBED

When a step is executed, it will restrictively return one of the following three alternative signal values:

succeeded failed blocked

In this array of outcomes, succeeded means that the execution of the step was successful. The step then remains on top of the stack and will again be called by the scheduler. The step has failed when the secondary condition of the step in question is not true. The consequence is that the step is not executed, but rather popped from the stack. When this step has been popped from the stack, the scheduler will call the next step that is now on top of the stack. The step is blocked when the secondary condition for executing the step is true, but the execution proper is impossible, for example because the step wants to read from a buffer that has no data available. In that case the step in question remains on top of the stack, but the scheduler will terminate execution thereof. The next time the scheduler will be activated, the same step will be called again. Another example is that the step in question is waiting for a particular interrupt signal. This latter blocked condition has mainly been intended for drivers. In fact, in many real-time operating systems, drivers that execute in system state can monopolize the CPU. When a driver gets blocked indeed, it should then return the CPU to guarantee the real-time behaviour of the system. Continuation of the driver can be guaranteed by calling the scheduler upon a timer interrupt, or another interrupt, such as a completion. In case of an application, the scheduler can be called via an endless loop. The operating system will prevent both deadlock and starvation in this case.

FIG. 5 shows an exemplary source code in C of a step scheduler, and which is represented in pseudo-code hereinafter. Line 110 states that step_stack has been defined externally as an object of type Stack: it represents a stack of pointers to the various steps. Line 112 defines scheduler as a function without parameters that returns a nil result. Bracket pairs like on lines 114/146 indicate repeated execution of the intermediate code. Line 116 defines a variable result of type StepResult. Line 118 indicates a do loop. Lines 120, 130, 136 indicate that the stack functions have the address of a stack as a parameter. Line 122 indicates that when upon addressing the step_stack proves to be empty, the effect of line 126 is that everything is saved. Line 130: the top functions produces a result that is a pointer to a step function. The asterisk indicates that the step itself is the real object. A variable result will herefore get as value the result of executing the step. If the result indicates a Failed outcome, the top item of the stack is popped off (line 136). As long as the result is not Blocked (line 142), the loop started on line 118 continues. This may produce each time the loop is executed a stream of results. The Succeeded outcome has not been specified explicitly, inasmuch as this leads to a stream of repeated outputs at each execution.

Pseudo-code the same step scheduler shown in may be, for example, based on the well-known Pascal computer language. Accolades delimit a comment. The explanation is as follows. A variable of type StepResult can assume each of three values: Succeeded, Failed or Blocked. The type Stack defines a stack of functions that each yield a StepResult as outcome. A global variable 'steps' of type Stack is declared. Within the procedure 'scheduler' two local variables are declared: a StepResult 'result' and a boolean 'nothing_to_schedule'. After 'scheduler' has been called it remains active as long as anything remains to be scheduled and the present 'step' does not get blocked. If a step fails (Failed), it is removed from the stack, with the consequence that the next step being on top of the stack is now executed. If a step succeeds (Succeeded) it is executed anew until it either fails or gets blocked. The term SKIP indicates 'No operation'. Generally, the pseudocode is straightforward.

What is claimed is:

1. A computer method for specifying a system, the method comprising executing the following in at least one data processing device:
 a. setting forth a structure of interconnected functional modules at respective hierarchical levels, each module embodying a respective state-based machine, wherein
  α. each non-top level first module comprises
   i. a transformer link, connected to a single second module at a next higher level, for enabling, a relevant change-of-state of the first module,
   ii. an observer link for receiving a state enquiry signal from the second module, and
   iii. an event link for outputting a solicited event signal to the second module,
   iv. means for retrosignalling an internal autonomously executed step
  β. each non-bottom module is, as such second module, arranged for at least connecting to one or more lower level modules, each of which then functions as such first module, and
  γ. a top module is arranged at least for signal exchanging with an environment, and
 b) for at least said first module, entering each said step into a single, step scheduler for the system, in order to render such step autonomously executable, said entering being subject to a preconditioning transformer signal to be received from said second module.

2. A method as claimed in claim 1, wherein said step scheduler is a stack scheduler and said entering is a push operation.

3. A method as claimed in claim 1, wherein such step is furthermore secondarily conditioned for executability by one or more of a transformer signal, or an underlying event, or an observer signal, any of these occurring onto said first module.

4. A method as claimed in claim 1, whilst restrictively defining a step upon its execution to return a value, the modules being arranged to be able to return each of the following three alternative values: succeeded, failed, or blocked.

5. A method as claimed in claim 4, wherein said succeeded value enables further execution of the step in question, said failed value disqualifies said step for further execution, and said blocked value retains said step for belated execution thereof.

6. A method as claimed in claim 1, specifying at least one additional non-top module interfacing to a plurality of non-bottom modules at a next higher level.

7. A method as claimed in claim 1 and defining control means for synchronized and serialized executing of any step in the modules, according to the rules of said structure.

8. A method as claimed in claim 2, wherein such step is furthermore secondarily conditioned for executability by one or more of a transformer signal, or an underlying event, or an observer signal, any of these occurring onto said first module.

9. A method as claimed in claim 2, whilst restrictively defining a step upon its execution to return a value, the modules being arranged to be able to return each of the following three alternative values: succeeded, failed, or blocked.

10. A method as claimed in claim 2, specifying at least one additional non-top module interfacing to a plurality of non-bottom modules at a next higher level.

11. A method as claimed in claim 2 and defining control means for synchronized and serialized executing of any step in the modules, according to the rules of said specifying.

12. The method of claim 1, wherein the functional modules are hardware data processing devices.

13. The method of claim 1, wherein the functional modules are data structures embodied in a computer medium readable by at least one digital data processing device.

14. A hardware digital data processing system comprising
 a) a plurality of distinct hierarchically arranged and interconnected hardware digital data processing modules each embodying a respective abstract state-based-machine, wherein
  i) each non-top first module comprises:
   A) a transformer link, connecting to a single second module at a next higher level, for enabling a relevant change-of-state of the first module,
   B) an observer link from the second module for receiving a state enquiry signal, and
   C) an event link to the second module for outputting a solicited event signal,
   D) means for retrosignalling an internal autonomous step, and
  ii) each non-bottom module is, as such second module, interconnected to one or more lower level modules, each of which then functions as such first module, and
  iii) a top module is arranged for signal interchanging with an environment,
 b) a single step scheduler for autonomously rendering each said step executable in said first module, and
 c) entering means for, under control of a preconditioning transformer signal received from said second module, entering said step into said scheduler.

15. A system as claimed in claim 14, wherein said step scheduler is a stack scheduler and said entering is a push operation.

16. A system as claimed in claim 14, wherein such step is furthermore secondarily conditioned for executability by one or more of a transformer signal, or an underlying event, or an observer signal, any of these occurring onto said first module.

17. A system as claimed in claim 14, wherein said modules are arranged for signalling upon execution of a step to return a value, the modules being arranged to be able to return each of the following three alternative values: succeeded, failed, or blocked.

18. A system as claimed in claim 17, wherein said succeeded value enables further execution of the step in question, said failed value disqualifies said step for further execution, and said blocked value retains said step for belated execution thereof.

19. A system as claimed in claim 14, wherein at least one additional first module interfaces to a plurality of second modules at a next higher level.

20. A system as claimed in claim 14 and having control means for synchronized and serialized executing of any step in the modules, according to the rules of the plurality of modules.

21. A system as claimed in claim 15, wherein such step is furthermore secondarily conditioned for executability by one or more of a transformer signal, or an underlying event, or an observer signal, any of these occurring onto said first module.

22. A system as claimed in claim 15, wherein said modules are arranged for signalling upon execution of a step to return a value, the modules being arranged to be able to return each of the following three alternative values: succeeded, failed, or blocked.

23. At least one medium, readable by at least one data processing device, the medium embodying a plurality of interconnected functional modules organized into hierarchical levels, each module embodying a respective abstract state-based machine, the embodiment comprising the following embodied in the medium:
 a single step scheduler;
 at least one non-top level first module comprising respective link means to a single second module at a next higher level, the link means comprising
  a transformer link for enabling a change of state of the first module responsive to the second module;
  an observer link for receiving a state inquiry signal from the second module;
  an event link for outputting a solicited event signal to the second module;
  retrosignalling means for retrosignalling the internal autonomously executed step;
 at least one non-bottom module, including the second module, each non-bottom module comprising at least one interface for accommodating the link means from at least one relevant one of the at least one non-top level first module, at least one of the non-bottom modules being a top module, the top module comprising means for signal exchanging with an environment;
wherein
 the at least one non-top first module enters each said step in the step scheduler in order to render such step autonomously executable in response to a preconditioning transformer signal received from said second module.

* * * * *